(12) United States Patent
Arekar et al.

(10) Patent No.: US 9,470,859 B2
(45) Date of Patent: Oct. 18, 2016

(54) OPTICAL TRANSCEIVER MODULE HAVING AN EARLY-DISENGAGE DELATCHING MECHANISM

(71) Applicant: Avago Technologies General IP (Singapore) Pte. Ltd., Singapore (SG)

(72) Inventors: Chaitanya G. Arekar, Dublin, CA (US); David J. K. Meadowcroft, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/631,899

(22) Filed: Feb. 26, 2015

(65) Prior Publication Data

US 2016/0252691 A1 Sep. 1, 2016

(51) Int. Cl.
*G02B 6/42* (2006.01)

(52) U.S. Cl.
CPC ........... *G02B 6/4261* (2013.01); *G02B 6/4292* (2013.01)

(58) Field of Classification Search
CPC .................. G02B 6/4261; G02B 6/4292

USPC ............................................. 385/88, 89, 92
See application file for complete search history.

(56) References Cited

U.S. PATENT DOCUMENTS

| 7,064,959 B2 | 6/2006 | Kim |
| 7,517,160 B2 | 4/2009 | Miyoshi et al. |
| 8,226,305 B2 | 7/2012 | Thirugnanam et al. |
| 2012/0106903 A1* | 5/2012 | Thirugnanam ...... G02B 6/4246 385/92 |

\* cited by examiner

*Primary Examiner* — Ryan Lepisto

(57) ABSTRACT

An optical transceiver module is provided with a delatching mechanism that allows module mounting density to be increased while also providing an ergonomic solution that allows the modules to be easily delatched and extracted from their cages. The delatching mechanism is configured to perform early disengagement of the module housing from the cage by delatching the module housing from the cage after the bail has been rotated to an angle that is less than 90°. Because delatching occurs when the bail has been rotated to a delatching angle that is less than 90°, the modules can be more densely stored with less space between modules that are mounted one above the other than with existing solutions.

24 Claims, 9 Drawing Sheets

OPTICAL TRANSCEIVER MODULE HAVING AN EARLY-DISENGAGE DELATCHING MECHANISM

TECHNICAL FIELD

The invention relates to optical transceiver modules. More particularly, the invention relates to an optical transceiver module having an early-disengage delatching mechanism.

BACKGROUND

In order to meet ever-increasing demands for higher information bandwidth, state-of-the-art digital communication switches, servers, and routers often use multiple rows of optical transceiver modules arranged in very close proximity to one another to increase module density. To be a commercially fungible product, the optical transceiver modules generally need to have basic dimensions and mechanical functionality that conform to an industry standard Multi-Source Agreement (MSA). Of course, many optical transceiver module designs that comply with and add value beyond the basic mechanical functionally set forth in the MSA are possible.

One known optical transceiver module design that complies with such an MSA is the Quad Small Form-Factor Pluggable (QSFP) optical transceiver module. QSFP optical transceiver modules are designed to mate with an opening formed in a cage. The module housing has one or more receptacles configured to mate with one or more respective optical connectors that terminate ends of respective optical fiber cables. The most common type of optical connector used with QSFP optical transceiver modules is called the LC optical connector.

When a QSFP or similar type of optical transceiver module is in a stored position inside of a cage, catches formed in opposite sides of the module housing engage respective latches formed in opposite sides of the cage to prevent the module housing from inadvertently coming out of the cage opening. Module housings of this type typically include a pair of cage latch stops formed on opposite outer side walls of the module housing that engage the pair of latches formed on opposite side walls of the cage to secure the module housing to the cage when the module housing is fully inserted into the cage.

With these types of module designs, a delatching mechanism is mechanically coupled to the module housing and is operable to delatch, or disengage, the latch stops of the module housing from the latches of the cage to allow the module to be extracted from the cage. The delatching mechanism includes a pair of slider arms that are linearly movable along the opposite outer side walls of the module housing and a bail that is rotatable by a user to allow it to be moved from a latched position to a delatched position. The bail is mechanically coupled to a yoke that is joined with proximal ends of the slider arms. The distal ends of the slider arms have respective hook features formed thereon that curve outwardly away from the respective outer side walls of the module housing.

When the module housing is fully inserted into the cage, the slider arms are positioned in between the respective outer side walls of the module housing and the respective inner side walls of the cage. Rotation of the bail to the delatched position pulls the slider arms along the respective outer side walls of the module housing in the direction toward the cage opening. As the slider arms move in this direction, the hook features on the distal ends of the arms press outwardly against the respective cage latches formed on the inner side walls of the cage, thereby causing the cage latches to disengage the respective cage latch stops formed in the opposite outer side walls of the module housing. The user then uses the bail as a handle to pull the module from the cage.

FIG. 1 illustrates a top perspective view of a known QSFP optical transceiver module 2 equipped with such a delatching mechanism 3 mechanically coupled with the module housing 2a. In FIG. 1, the bail 3a of the delatching mechanism 3 is in the latched position. FIG. 2 illustrates a side plan view of the QSFP optical transceiver module 2 shown in FIG. 1 with the bail 3a of the delatching mechanism 3 in the latched position. FIG. 3 illustrates a side plan view of the QSFP optical transceiver module 2 shown in FIG. 1 with the bail 3a of the delatching mechanism 3 in the delatched position.

The delatching mechanism 3 also includes slider arms 3b and 3c and a yoke 3d, which is joined with proximal ends of the slider arms 3b and 3c. In FIG. 1, only one of the slider arms 3b is visible, and in FIGS. 2 and 3, only the other slider arm 3c is visible. The bail 3a is mechanically coupled to the yoke 3d via a cam/cam follower arrangement that will be described below in more detail. The yoke 3d is movable in the forward and rearward directions represented by arrows 5 and 6, respectively. A spring (not shown) of the delatching mechanism 3 continuously exerts a force on the yoke 3d in the rearward direction represented by arrow 6 such that when there is no force or a smaller force exerted on the yoke 3d in the forward direction represented by arrow 5, the yoke 3d returns to its rearward position shown in FIGS. 1 and 2.

Two press-fit pins 7 pass through respective holes (not shown) formed in opposite sides of the bail 3a, through respective slots (not shown) formed in opposite sides of the yoke 3d, and are press fit into respective blind holes (not shown) formed in opposite sides of the module housing 2a. The press-fit pins 7 rotationally couple the bail 3a to the module housing 2a. The bail 3a has cams 8 disposed on opposite sides thereof that engage cam followers 9 disposed on opposite sides of the yoke 3d when the bail 3a is rotated from the latched position shown in FIGS. 1 and 2 to the delatched position shown in FIG. 3. The engagement of the cams 8 with the cam followers 9 from the time of initial engagement until the bail 3a has been fully rotated to the delatched position shown in FIG. 3 pulls the yoke 3d in the forward direction represented by arrow 5. Movement of the yoke 3d in this direction results in movement of the slider arms 3b and 3c in the same direction. This movement of the slider arms 3b and 3c causes hook features 3e and 3f disposed on distal ends of the slider arms 3b and 3c, respectively, to move from their rearward positions shown in FIG. 2 to their forward positions shown in FIG. 3.

When the module 2 is inside of a cage (not shown), the movement of the hook features 3e and 3f from their rearward positions to their forward positions causes them to press outwardly against the aforementioned cage latches formed on the inner side walls of the cage, thereby causing the cage latches to disengage respective cage latch stops 2b (FIG. 1) and 2c (FIGS. 2 and 3) formed in the opposite outer side walls of the module housing 2a. The user may then use the bail 3a as a handle to pull the module 2 from the cage.

Typically, the cams 8 of the bail 8a do not make contact with the cam followers 9 until the bail 3a has been rotated from the latched position shown in FIGS. 1 and 2 by an angle of about 80°, i.e., the delatching mechanism 3 has a passive stroke of about 80°. Once the cams 8 make contact with the cam followers 9, further rotation of the bail 3a by an angle of about 90° or slightly greater from the latched position places the bail in the delatched position shown in FIG. 3. Once the bail 3a has been rotated to the delatched position, a user typically uses a thumb (not shown) placed on the upper side of the bail 3a and a finger (not shown) placed on the lower side of the bail 3a to grip the bail 3a and pull the module 2 from the cage.

One of the disadvantage of the known delatching mechanism 3 described above with reference to FIGS. 1-3 is that there must be space below the bail 3a when it is in the delatched position for the user's finger to grip the lower side of the bail 3a in order to extract the module 2 from the cage. For this reason, when storing multiple modules 2 in cages one above the other in close proximity to one another, the modules 2 must be spaced apart to provide space for the user to grip the bails 3a. This reduces module mounting density, which can lead to reduced bandwidth due to spatial constraints. In addition, storing the modules 2 in this way is a poor solution in terms of ergonomics in that it makes it difficult or impossible for a user to delatch and extract the modules 2. Also, for modules 2 that are stored in cages closer to the ground, it is difficult for a user to properly grip the bail 3a with a finger and thumb and use the bail 3a as a handle to extract the module 2 from the cage when the bail 3a is in the delatched position.

Another disadvantage of the known delatching mechanism 3 described above with reference to FIGS. 1-3 is that there is nothing to prevent a user from plugging an optical LC connector (not shown) into one of the receptacles 11 when the module 2 is in the delatched state shown in FIG. 3. With modules having the design shown in FIGS. 1-3, the LC connector should only be mated with the receptacle 11 when the module is in the latched state shown in FIGS. 1 and 2. If the LC connector is mated with the receptacle 11 when the module is in the delatched state shown in FIG. 3, the bail 3a will not be able to be rotated into the latched position that it needs to be in to latch the module housing 2a with the cage. However, because there is nothing to prevent an LC connector from being mated with the receptacle 11 when the module 2 is in the delatched state, the design is prone to human error and therefore improper installment can occur.

A need exists for a delatching mechanism that allows module mounting density to be increased while also providing an ergonomic solution that allows the modules to be easily delatched and extracted from their cages.

SUMMARY OF THE INVENTION

The invention is directed to an optical transceiver module having an early-disengage delatching mechanism and/or a safety feature that prevents an optical connector from being mated with a receptacle of the module if the bail is not in a latched position. In accordance with an embodiment, the optical transceiver module comprises a module housing and an early-disengage delatching mechanism secured to a module housing. The module housing has at least a first receptacle formed in a front end thereof for receiving a first optical connector of a first optical fiber cable. The module housing has at least a top, a bottom, a first side and a second side. The early-disengage delatching mechanism includes a bail that is rotationally coupled with the module housing and that is rotatable from a latched position to a delatched position. Rotation of the bail away from the latched position by a predetermined delatching angle that is less than 90° places the bail in the delatched position. Placement of the bail in the delatched position delatches the module housing from the cage to allow the module to be extracted from the cage.

In accordance with another embodiment, the optical transceiver module comprises a module housing, a delatching mechanism and a safety feature. The module housing has at least a first receptacle formed in a front end thereof for receiving a first optical connector of a first optical fiber cable. The module housing has at least a top, a bottom, a first side and a second side. The delatching mechanism is secured to the module housing and includes a bail that is rotatable from a latched position to a delatched position. Rotation of the bail to the delatched position delatches the module housing from a cage to allow the module to be extracted from the cage. The safety feature prevents an optical connector from being mated with the receptacle when the bail is not in the latched position.

These and other features and advantages will become apparent from the following description, drawings and claims.

BRIEF DESCRIPTION OF THE DRAWINGS

FIGS. 9A and 8B illustrate top and bottom perspective views, respectively, of a front portion of the module housing shown in FIG. 4 without the delatching mechanism.

DETAILED DESCRIPTION OF AN ILLUSTRATIVE EMBODIMENT

Figure 1:
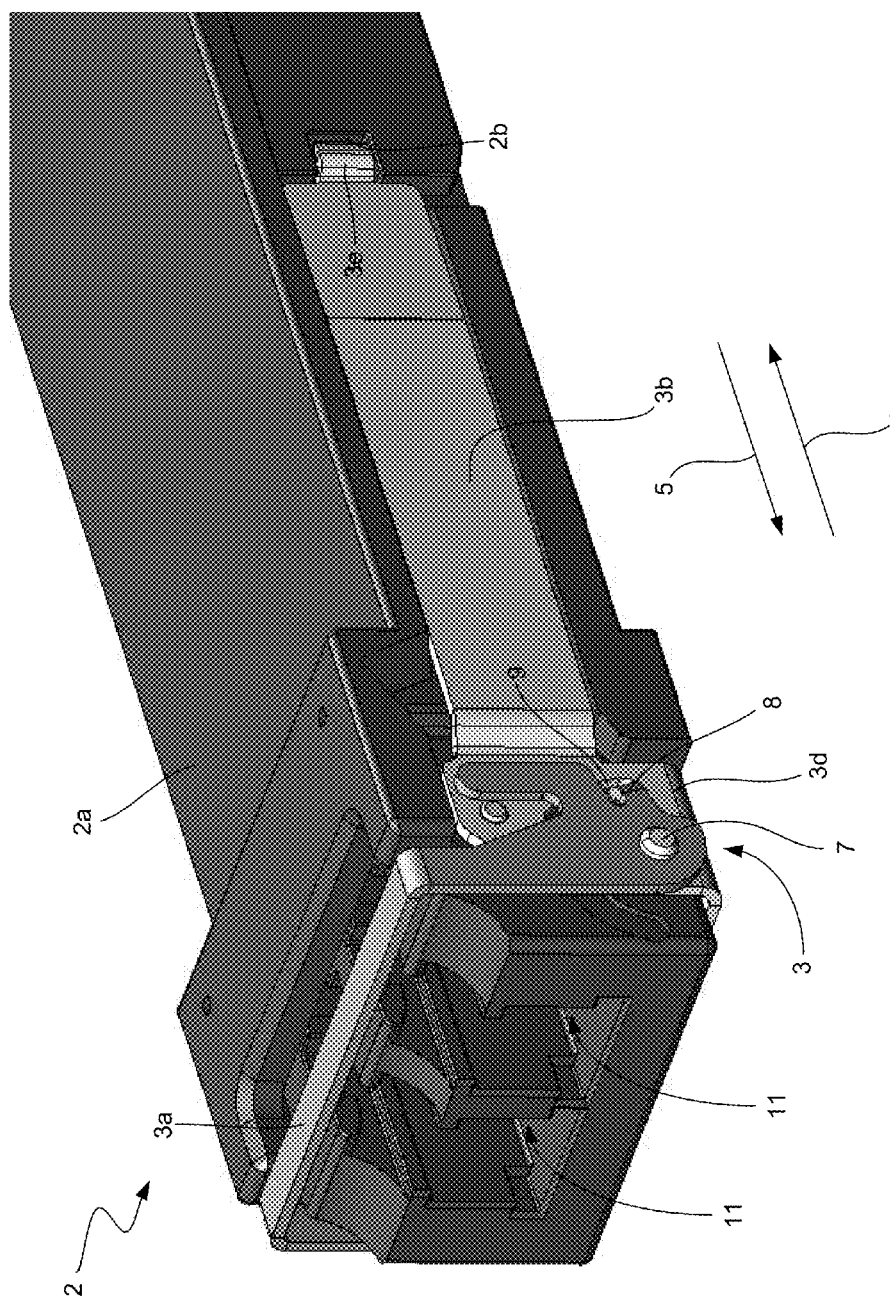
FIG. 1 illustrates a top perspective view of a known QSFP optical transceiver module equipped with a known delatching mechanism that is mechanically coupled with the module housing.

In accordance with illustrative embodiments of the invention, an optical transceiver module is provided with a delatching mechanism that allows module mounting density to be increased while also providing an ergonomic solution that allows the modules to be easily delatched and extracted from their cages. The delatching mechanism is configured to perform early disengagement of the module housing from the cage by delatching the module housing from the cage after the bail has been rotated to an angle that is less than 90°. Because delatching occurs when the bail has been rotated to a delatching angle that is less than 90°, the modules can be more densely stored with less space between modules that are mounted one above the other than with the known solution described above with reference to FIGS. 1-3.

In accordance with an illustrative embodiment, delatching does not occur until the bail has been rotated to at least some minimum angle that is greater than 0° to prevent the module from inadvertently being removed from the cage prior to the bail being rotated past the minimum angle. Illustrative, or exemplary, embodiments will now be described with reference to FIGS. 4-9C, in which like reference numerals represent like components, features or elements. It should be noted that features, elements or components shown in the figures are not necessarily drawn to scale, emphasis instead being placed on the principles and concepts of the invention.

Figure 4:
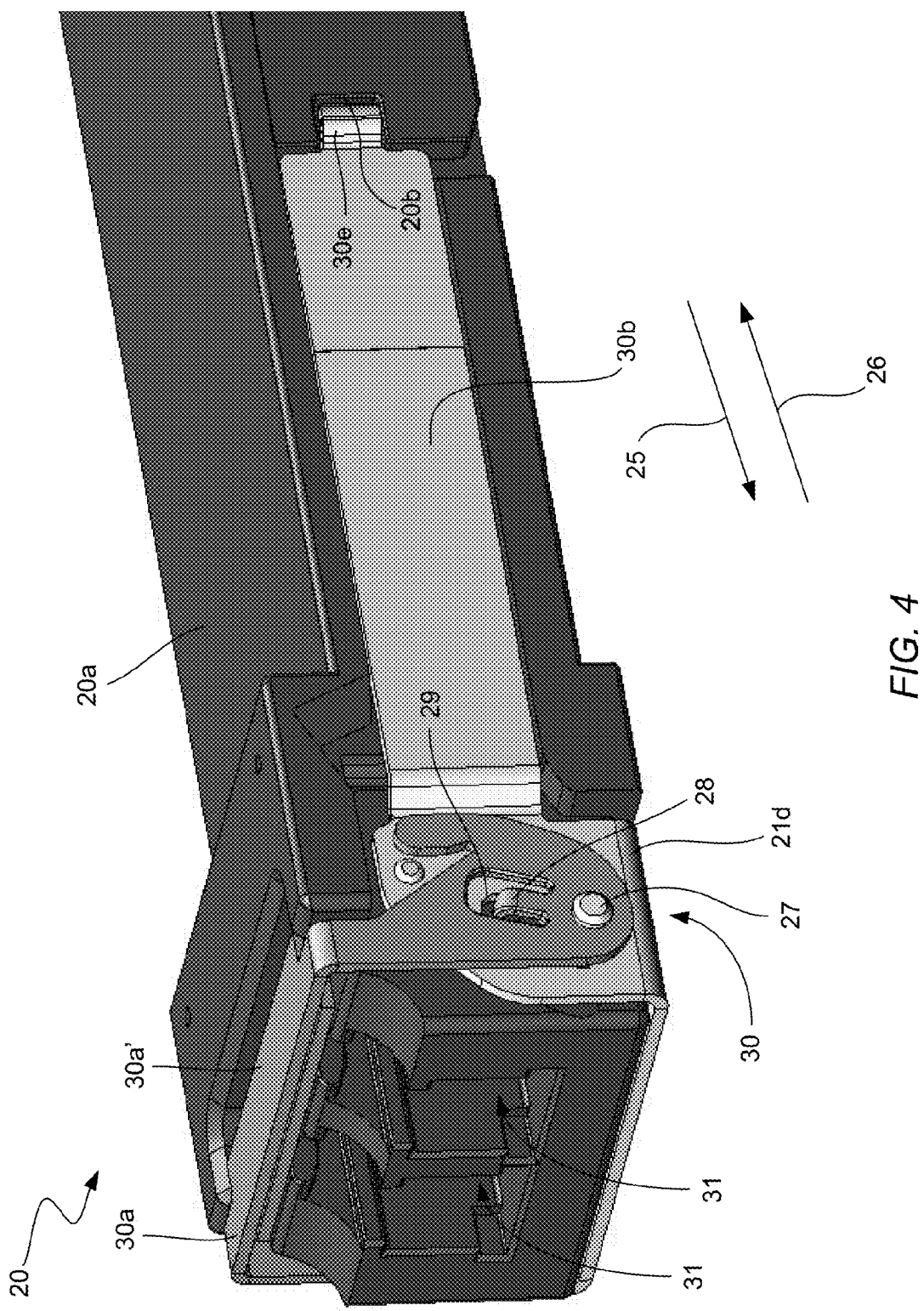
FIG. 4 illustrates a top perspective view of an optical transceiver module in accordance with an illustrative embodiment equipped with an early-disengage delatching mechanism that is mechanically coupled with a housing of the optical transceiver module.

FIG. 4 illustrates a top perspective view of an optical transceiver module 20 in accordance with an illustrative embodiment equipped with an early-disengage delatching mechanism 30 that is mechanically coupled with a housing 20a of the optical transceiver module 20. The early-disengage delatching mechanism 30 has a bail 30a, first and second slider arms 30b and 30c, and a yoke 30d joined with proximal ends of the slider arms 30b and 30c. The slider arms 30b and 30c have hook features 30e and 30f, respectively, on their distal ends that curve outwardly away from the side walls of the module housing 20a. The bail 30a has cams 28 disposed on opposite sides thereof that engage cam followers 29 disposed on opposite sides of the yoke 30d when the bail 30a is rotated through a particular range of angles, as will be described below with reference to FIGS. 5B and 5C.

In FIG. 4, the bail 30a is in a latched position. When the bail 30a is in the latched position and the module 20 is inside of a cage (not shown), cage latches (not shown) formed on the inner side walls of the cage are engaged with respective cage latch stops 20b (FIG. 4) and 20c (FIG. 5B) formed in the opposite outer side walls of the module housing 20a. FIG. 5A illustrates a side plan view of the optical transceiver module 20 shown in FIG. 4 with the bail 30a of the delatching mechanism 30 rotated by an angle of 12° from the latched position shown in FIG. 4. FIG. 5B illustrates a side plan view of the optical transceiver module 20 shown in FIG. 4 with the bail 30a of the delatching mechanism 30 rotated by an angle of 27° from the latched position shown in FIG. 4. FIG. 5C illustrates a side plan view of the optical transceiver module 20 shown in FIG. 4 with the bail 30a of the delatching mechanism 30 rotated by an angle of 46° from the latched position shown in FIG. 4.

In FIG. 4, only one of the slider arms 30b is visible, and in FIGS. 5A-5C, only the other slider arm 30c is visible. The yoke 30d is movable in the forward and rearward directions represented by arrows 25 and 26, respectively. A spring (not shown) of the delatching mechanism 30 continuously exerts a force on the yoke 30d in the rearward direction represented by arrow 26 such that when there is no force or a smaller force exerted on the yoke 30d in the forward direction represented by arrow 25, the yoke 30d returns to its rearward position shown in FIGS. 4 and 5A.

Pins 27 pass through holes (not shown) formed in opposite sides of the bail 30a and through slots (not shown) formed in opposite sides of the yoke 30d. The pins 27 are secured to, or disposed on, opposite sides of the module housing 20a, as will be described below in more detail with reference to FIGS. 8A-9C. The pins 27 rotationally couple the bail 30a to the module housing 20a. The bail 30a has cams 28 disposed on opposite sides thereof that engage cam followers 29 disposed on opposite sides of the yoke 30d when the bail 30a is rotated by a particular angular amount away from the latched position shown in FIG. 4, as will now be described with reference to FIGS. 5A-5C.

In accordance with an illustrative embodiment, the bail 30a has a passive stroke, or dwell stroke, angle of 12°. In other words, the cams 28 do not begin to make contact with the cam followers 29, and thus the slider arms 30b and 30c do not move in the forward direction, until the bail 30a has been rotated by an angle of 12° from the latched position shown in FIG. 4 to the active position shown in FIG. 5A.

In accordance with this illustrative embodiment, the bail 30a has an active stroke angular range of 12° to 46°. During the active stroke, interaction between the cams 28 and the cam followers 29 causes the yoke 30d to be moved in the forward direction represented by arrow 25, which causes the slider arms 30b and 30c to also move in the forward direction. As shown in FIG. 5B, rotation of the bail 30a from the passive stroke angle of 12° from the latched position to 27° from the latched position causes the yoke 30d to move a distance d1 in the forward direction represented by arrow 25, which causes the slider arms 30b and 30c to also move in the forward direction. Movement of the yoke 30d in the forward direction by distance d1 is insufficient to cause the hook features 30e and 30f disposed on the distal ends of the slider arms 30b and 30c, respectively, to disengage the cage latches (not shown) from the respective cage latch stops 20b and 20c.

However, continued rotation of the bail 30a to 46° from the latched position results in movement of the yoke 30d in the forward direction by distance d2, which is sufficient to cause the hook features 30e and 30f disposed on the distal ends of the slider arms 30b and 30c, respectively, to disengage the cage latches (not shown) from the respective cage latch stops 20b and 20c. Thus, in accordance with this illustrative embodiment, the delatching angle is 46°.

Figure 5:
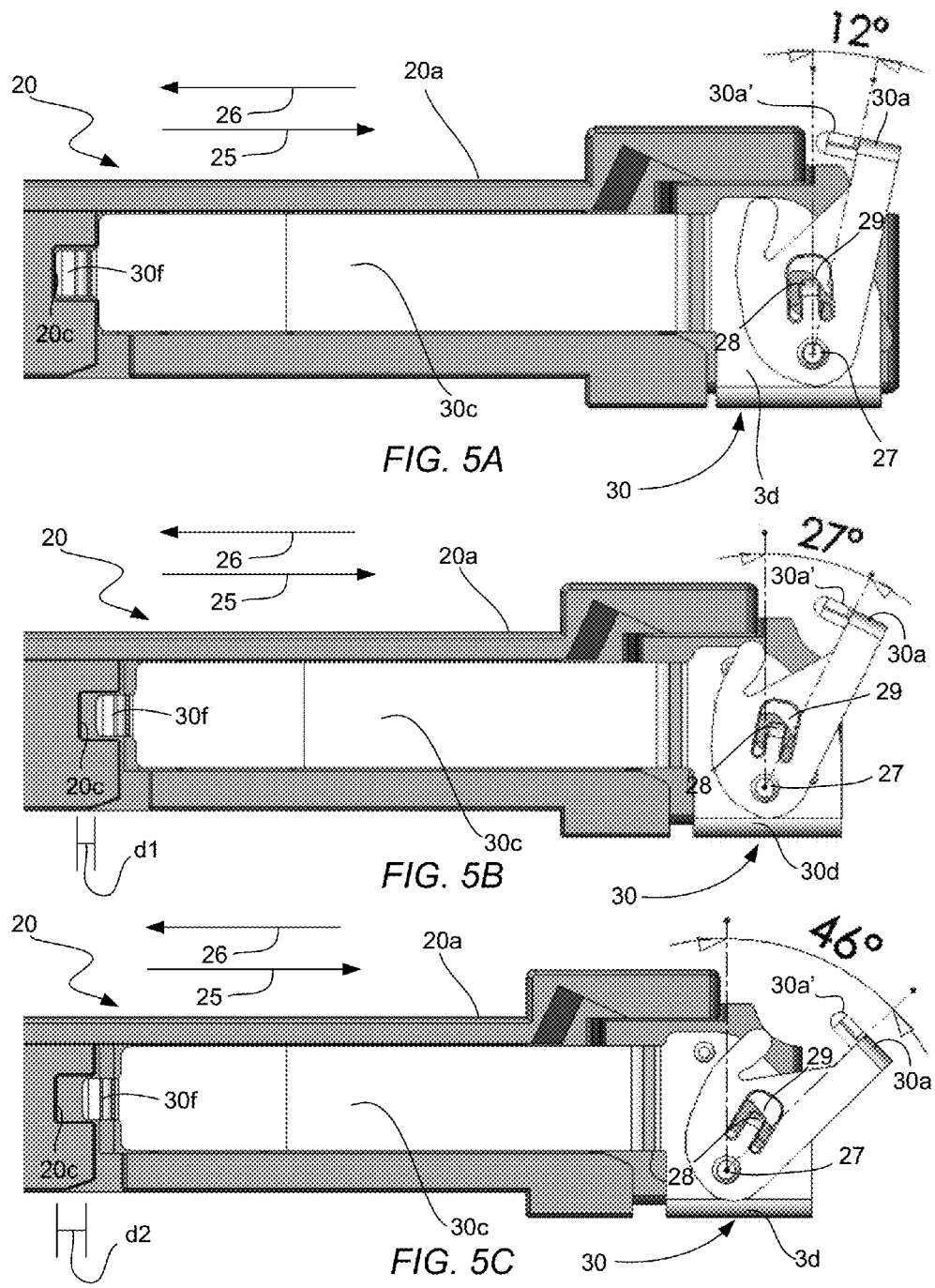
FIG. 5A illustrates a side plan view of the optical transceiver module shown in FIG. 4 with the bail of the delatching mechanism rotated by an angle of 12° from the latched position shown in FIG. 4.
FIG. 5B illustrates a side plan view of the optical transceiver module shown in FIG. 4 with the bail of the delatching mechanism rotated by an angle of 27° from the latched position shown in FIG. 4.
FIG. 5C illustrates a side plan view of the optical transceiver module shown in FIG. 4 with the bail of the delatching mechanism rotated by an angle of 46° from the latched position shown in FIG. 4.
Figure 6:
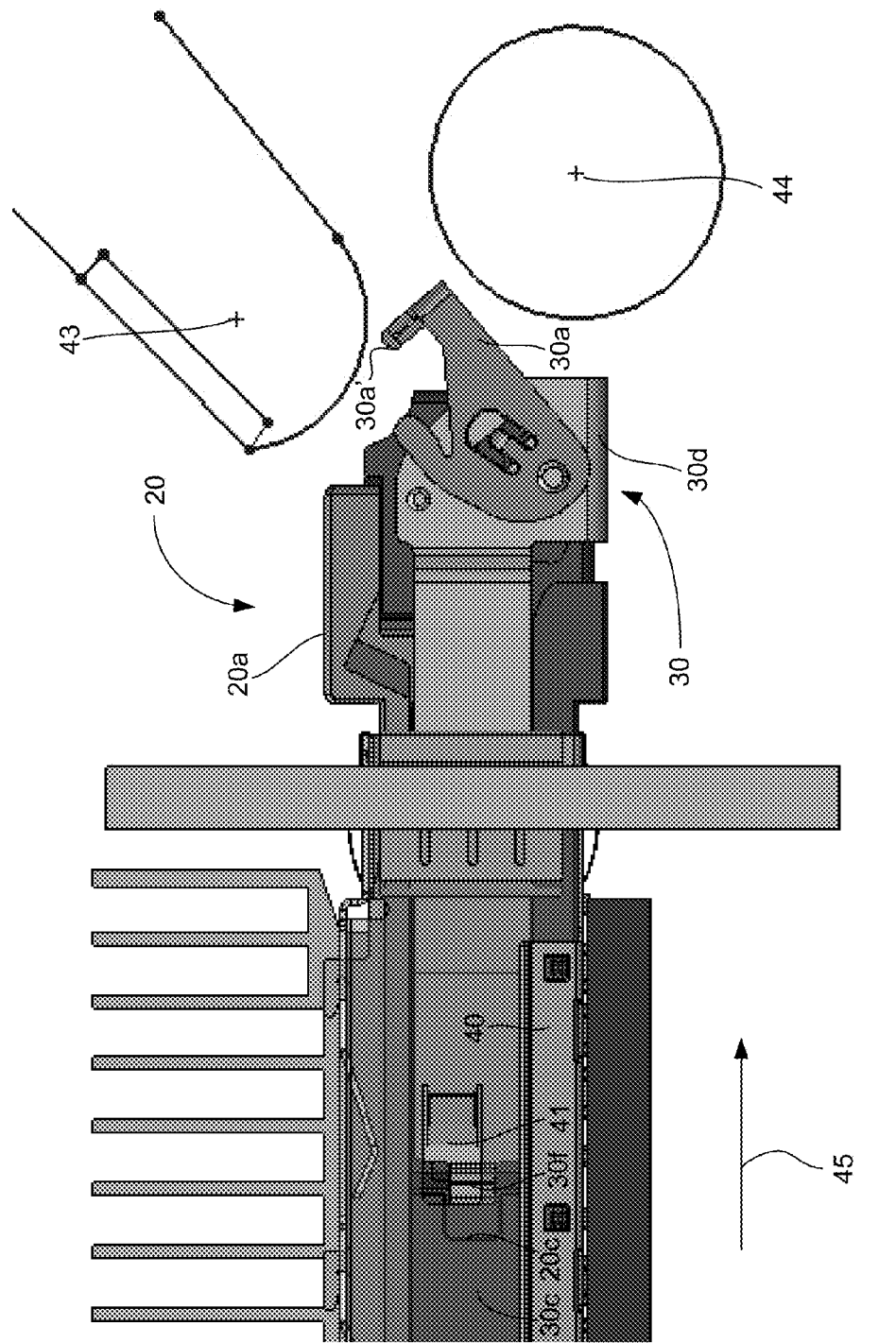
FIG. 6 illustrates a side plan view of the optical transceiver module shown in FIG. 5C disposed inside of a cage with the bail rotated by an angle of 46° from the latched position shown in FIGS. 4 and 5A.

FIG. 6 illustrates a side plan view of the optical transceiver module 20 shown in FIG. 5C disposed inside of a cage 40 with the bail 30a rotated by the delatching angle of 46° from the latched position shown in FIGS. 4 and 5A. In FIG. 6, a side of the cage 40 has been removed to reveal the interaction between the hook feature 30f and one of the cage latches 41. In the delatched state of the module 20 shown in FIG. 6, the hook feature 30f has pushed the cage latch 41 outwardly such that the cage latch 41 is no longer engaged with the cage latch stop 20c. The same operation occurs on the opposite side of the cage 40 to cause the cage latch stop 20b to disengage from the cage latch (not shown) disposed on the opposite inner side wall of the cage 40.

Once the bail 30a has been moved to the delatched position shown in FIG. 6, a user (not shown) can use a thumb, represented in FIG. 6 by shape 43, and a finger, represented in FIG. 6 by shape 44, to grip the bail 30a and use it as a handle to pull the module 20 in the direction represented by arrow 45 to extract the module 20 from the cage 40. Because of the angle of the bail 30a, extra space is not needed between the module 20 and a like module 20 positioned above or below it (not shown) to provide space for the thumb and finger to grip the bail 30a. With the module 2 described above with reference to FIGS. 1-3, when the bail 3a is in the delatched position shown in FIG. 3, the user's finger would be much farther below the position of the finger 44 shown in FIG. 6 when the finger and thumb grip the bail 30a. As indicated above with reference to FIG. 3, this lower positioning of the finger requires that the modules 2 be spaced farther apart from one another in the vertical direction to accommodate the extraction process. The delatching mechanism 30 of the module 20 shown in FIGS. 4-6 obviates the need for this additional space, thereby allowing greater mounting density in the vertical direction, i.e., one atop the other.

Figure 2:
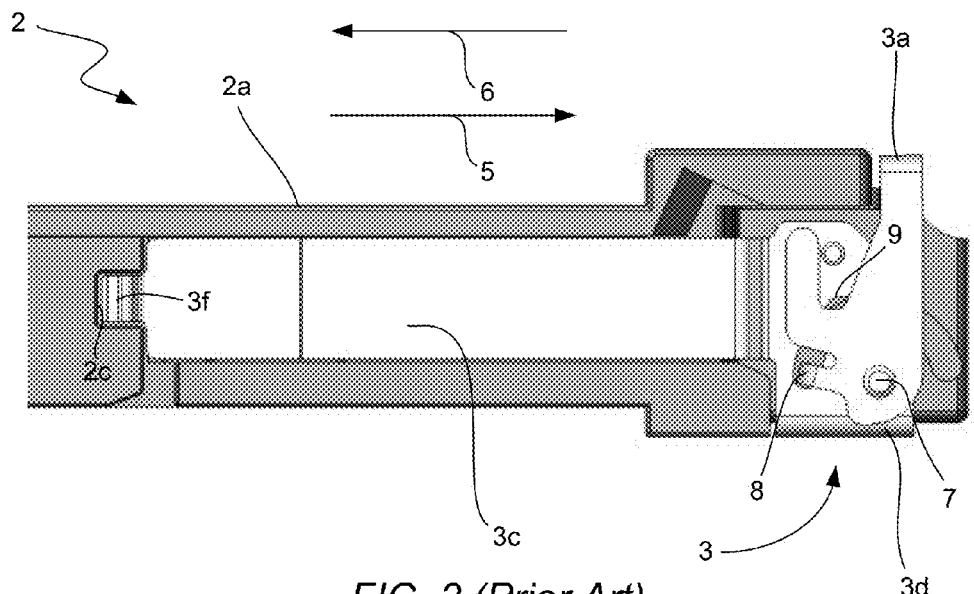
FIG. 2 illustrates a side plan view of the QSFP optical transceiver module shown in FIG. 1 with the bail of the delatching mechanism in the latched position.
Figure 3:
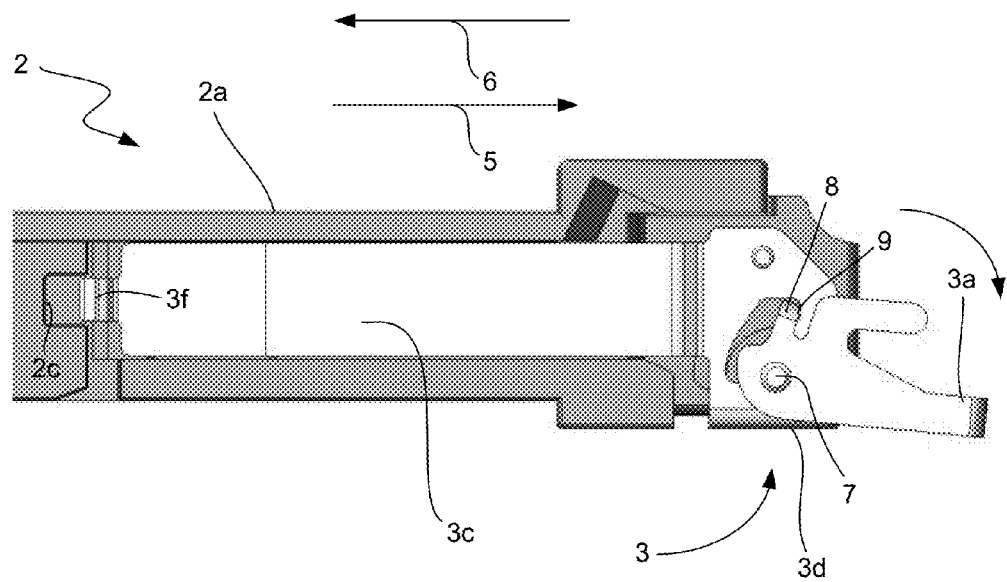
FIG. 3 illustrates a side plan view of the QSFP optical transceiver module shown in FIG. 1 with the bail of the delatching mechanism in the delatched position.

In addition, the aforementioned difficulty associated with extracting the module 2 shown in FIGS. 1-3 from a cage (not shown) when the cage is close to the ground is overcome by the early-disengage delatching mechanism 30. In the delatched position of the bail 30a shown in FIG. 6, the bail 30a can easily be gripped by a user to extract the module 20 from the cage 40 even if the cage 40 is positioned near the ground. Also, it is easier for a user to rotate the bail 30a to the delatched position shown in FIG. 6 than it is for a user to rotate the bail 3a to the delatched position shown in FIG. 3 when the cage is near the ground. Therefore, the early-disengage delatching mechanism 30 is a much better solution in terms of ergonomics than the known delatching mechanism 3.

In accordance with this illustrative embodiment, delatching occurs when the bail 30a has been rotated by a delatching angle of 46° from the latched position shown in FIGS. 4 and 5A. However, the delatching angle could be less than or greater than 46°, provided that the delatching angle is greater than 0° and less than 90°. The delatching angle is typically selected to be in the range of about 30° to about 80° and is typically about 46°.

The dwell stroke angle, which is 12° in the illustrative embodiment, can be any angle that is greater than 0° and less than the delatching angle. The dwell stroke angle is typically selected to be in the range of about 5° to about 18°. The purpose of having a dwell stroke angle that is greater than 0° is to allow some movement of the bail 30a away from the latched position without causing the module 20 to be placed in the delatched state. For example, inadvertent movement of the bail 30a can occur when an optical connector (not shown) is being disconnected from one of the receptacles 31 (FIG. 4). Having a dwell stroke angle that is greater than 0° can prevent such inadvertent movement of the bail 30a from placing the module 20 in the delatched state.

However, the dwell stroke angle could be eliminated altogether such that any movement of the bail 30a away from the latched position toward the delatched position is an active stroke that results in engagement of the cams 28 with the cam followers 29 and movement of the yoke 30d in the forward direction. For example, if the dwell stroke angle is eliminated and the delatching angle is 20°, the active stroke would be from 0° to 20° such that the delatching operation would begin when there is movement of the bail 30a away from the latched position and would end when the bail 30a is at an angle of 20° relative to the latched position of the bail 30a.

Figure 7:
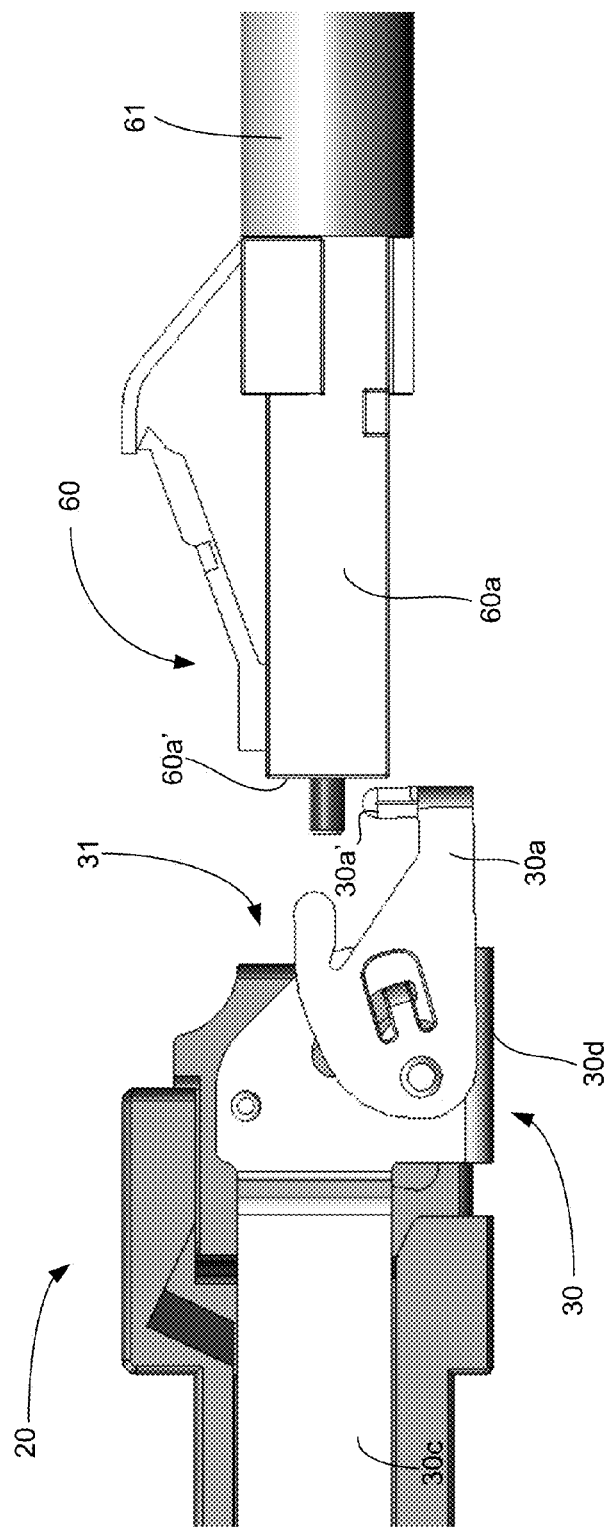
FIG. 7 illustrates the module shown in FIGS. 4-6 with the bail rotated past the delatching position to an angle of 90° from the latched position and an optical connector of an optical fiber cable configured to be inserted into a receptacle of the module.

FIG. 7 illustrates the module 20 shown in FIGS. 4-6 with the bail 30a rotated past the delatching position to an angle of 90° from the latched position and an optical connector 60 of an optical fiber cable 61 configured to be inserted into a receptacle 31 of the module 20. In accordance with an illustrative embodiment, the bail 30a has a safety feature 30a' on it that prevents the optical connector 60 from being inserted into either of the receptacles 31 (FIG. 4) when the bail 30a is in the position shown in FIG. 7. In accordance with this illustrative embodiment, the optical connector 60 is an LC optical connector having a connector body 60a. The safety feature 30a', in accordance with this illustrative embodiment, is a portion of the bail 30a that has been widened such that when the bail 30a has been rotated by an angle of 90° from the latched position, the safety feature 30a' partially blocks the receptacle 31.

When the bail 30a is in the position shown in FIG. 7, and an attempt is made by a user (not shown) to insert the connector 60 into one of the receptacles 31, a front end 60a' of the connector body 60a will abut the safety feature 30a', thereby preventing the connector 60 from mating with the receptacle 60. If an attempt is made by a user (not shown) to insert the connector 60 into one of the receptacles 31 while the bail 30a is at any other angle between the latched position shown in FIG. 4 and the 90° position shown in FIG. 7, the front end 60a' of the connector body 60a will abut some portion of the bail 30a. In this way, the safety feature 30a' prevents a user from inserting an optical connector into one of the receptacles 31 when the bail 30a is not in the latched position shown in FIG. 4.

As described above with reference to FIGS. 1-3, the known optical transceiver module 2 shown in FIGS. 1-3 does not have such a safety feature. Therefore, a user can successfully mate an optical connector with either of the receptacles 11 of the module housing 2a when the bail 2a is in the delatched position shown in FIG. 3. This can lead to modules 2 being inserted into the respective cages without the module housings 2a being latched inside of the cages, which can result in the modules 2 inadvertently coming out of the cages. The safety feature of the invention prevents this from happening because the user will realize, after making an unsuccessful attempt to mate the optical connector 60 with the receptacle 31, that the bail 30a must be placed in the latched position shown in FIG. 4 before the connector 60 can be successfully mated with the receptacle 31.

Although the safety feature 30a' in accordance with this illustrative embodiment is a widened portion of the bail 30a, a variety of devices or features could be used to perform this function of blocking the receptacles 31 when the module 20 is not in the latched position, as will be understood by persons of skill in the art in view of the description being provided herein. Therefore, the safety feature is not limited to a widened portion of the bail for performing this function. For example, another option would be to have the bail 30a act as a triggering mechanism that causes a separate device or element inside of or in front of the receptacles to block the receptacles 31 when the bail 30a is rotated away from the latched position shown in FIG. 4 and to unblock the receptacles 31 when the bail 30a is rotated to the latched position shown in FIG. 4. The widened portion 30a' of the bail 30a is merely one embodiment for performing this function, as will be understood by those of skill in the art in view of the description provided herein.

The bail 30a may be rotationally or pivotally coupled to the module housing 20a in a number of ways. The same press-fit pins 7 and blind holes (not shown) described above with reference to FIGS. 1-3 for rotationally coupling the bail 3a to the module housing 2a may be used to rotationally couple the bail 30a to the module housing 20a. However, other rotational coupling configurations may instead be used for this purpose. A few illustrative alternative embodiments for rotationally coupling the bail 30a to the module housing 20a will now be described with reference to FIGS. 8A-9C.

Figure 8A:
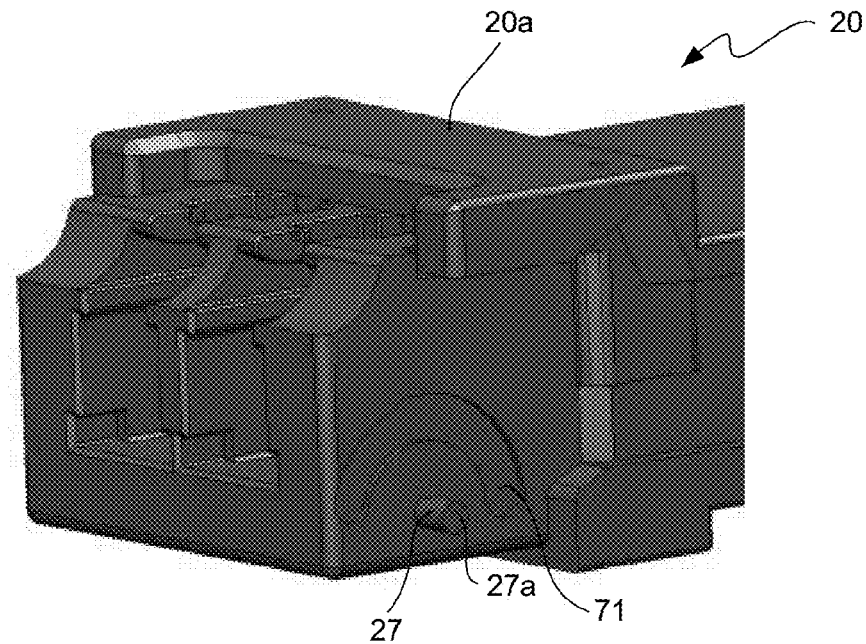
FIGS. 8A and 8B illustrate top perspective views of a front portion of the module housing shown in FIG. 4 without and with the delatching mechanism rotationally coupled thereto, respectively.
Figure 8B:
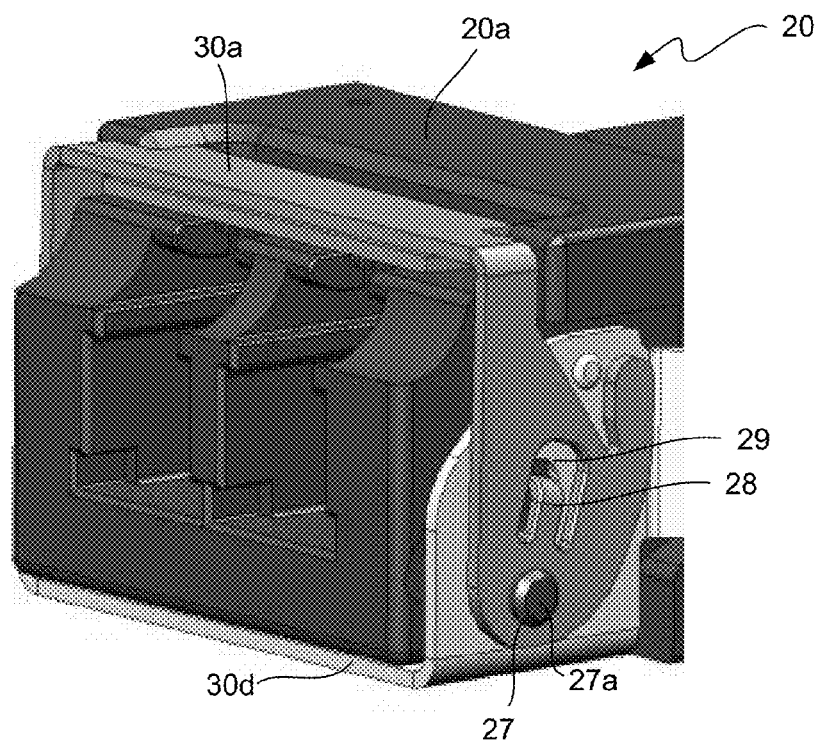

FIGS. 8A and 8B illustrate top perspective views of a front portion of the module housing 20a shown in FIG. 4 without and with the delatching mechanism 30 rotationally coupled thereto, respectively. In accordance with this illustrative embodiment, the pins 27 that rotationally couple the bail 30a to the module housing 20a are bosses that are integral parts of the module housing 20a and protrude therefrom, as shown in FIG. 8A. Only one of the bosses 27 is visible in FIGS. 8A and 8B, but they mirror one another. The module housing 20a is typically made of cast metal, and therefore the bosses 27 are typically made of cast metal.

The bosses 27 are cylindrical in shape and pass through circular holes (not shown) formed in opposite sides of the bail 30a. The circular holes formed in the bail 30a have a diameter that is equal to or slightly greater than the diameter of the bosses 27. The bosses 27 also pass through slots (not shown) formed in the yoke 30d. The slots have a width that is equal to or slightly greater than the diameter of the bosses 27. The slots formed in the yoke 30d extend in the linear directions of movement of the yoke 30d to allow the yoke 30d to move in the forward and rearward directions relative to the fixed bosses 27. Distal ends 27a of the bosses 27 are swedged, or flattened, against the outer sides of the bail 30a to make them wider in diameter than the diameter of the holes formed in the bail 30a to prevent the bail 30a from working its way free of the bosses 27. The module housing 20a has arcuate grooves 71 formed in opposite sides thereof for guiding respective ends of the cams 28 during rotation of the bail 30a.

Figure 9A:
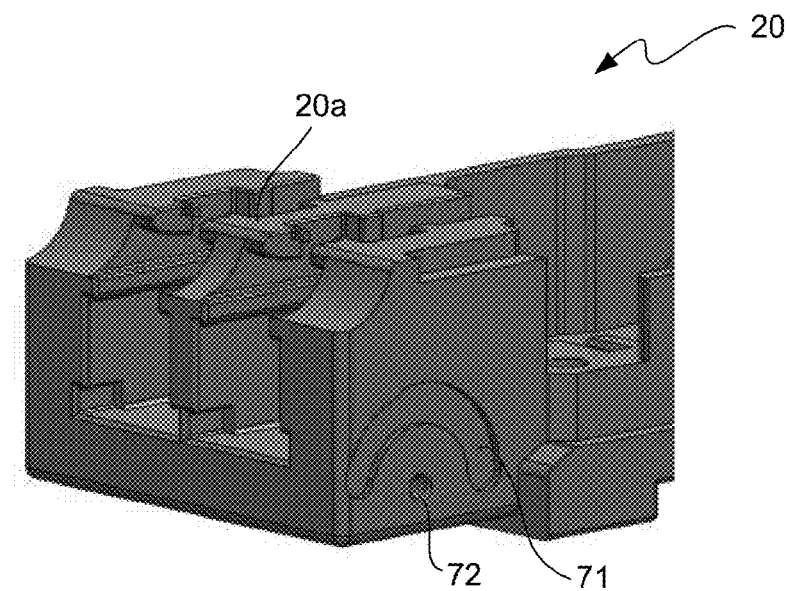

FIGS. 9A and 8B illustrate top and bottom perspective views, respectively, of a front portion of the module housing 20a shown in FIG. 4 without the delatching mechanism 30. FIG. 9C illustrates a bottom perspective view of the front portion of the module housing 20a shown in FIG. 4, but with the delatching mechanism 30 rotationally coupled thereto. In accordance with this illustrative embodiment, the module housing 20a has through holes 72 formed in opposite sides thereof. Pins 27 having heads 27a that are greater in diameter than the diameter of the through holes 72 are inserted through the holes formed in the bail 30a, through the slots formed in the yoke 30d and through the holes 72 formed in the module housing 20a such that ends 27b of the pins 27 are disposed on a lower side of the module housing 20a and are accessible. The ends 27b are then swedged, or flattened, against inner walls of the module housing 20a to make the ends 27b wider in diameter than the diameter of the through holes 72 to prevent the pins 27 from working their way free.

Figure 9B:
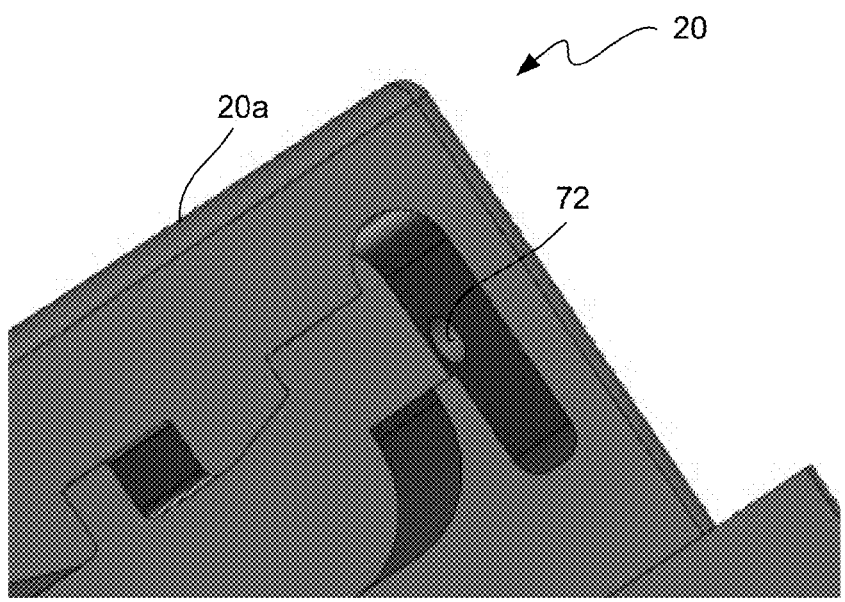
Figure 9C:
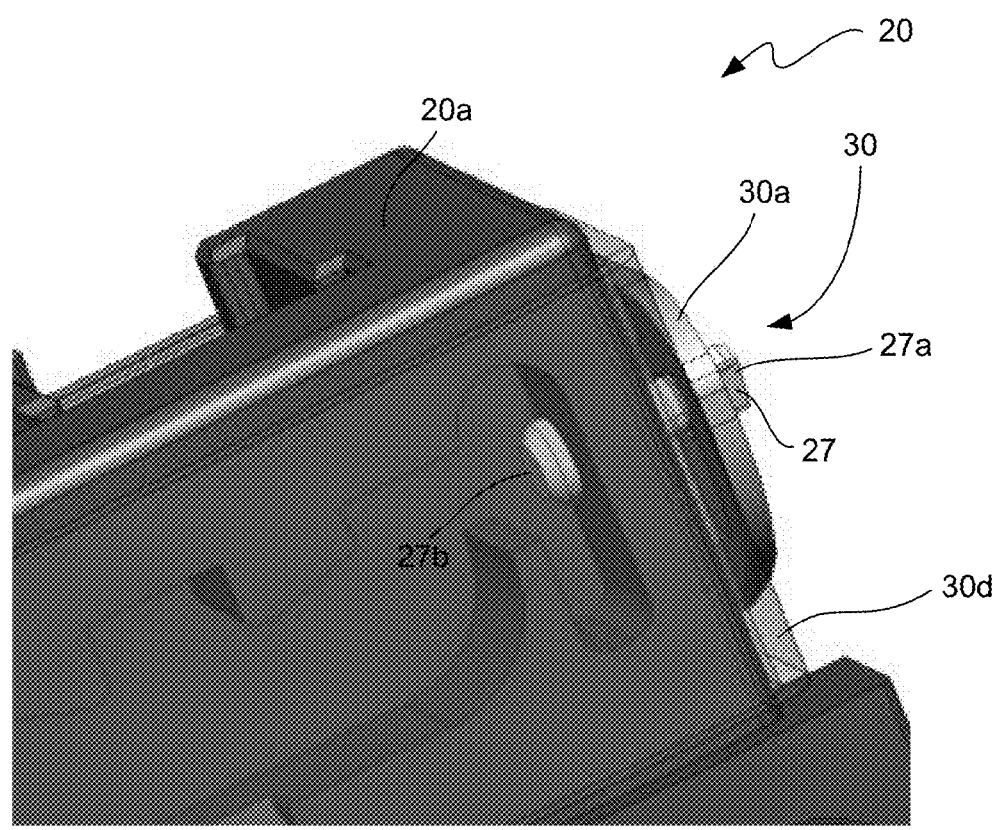
FIG. 9C illustrates a bottom perspective view of the front portion of the module housing shown in FIG. 4, but with the delatching mechanism rotationally coupled thereto.

One advantage to using the rotational coupling configuration shown in FIGS. 9A-9C is that the pins 27 can be cut off to remove or replace the bail 30a. In some cases, it may be desirable to use a pull tab (not shown) rather than the bail 30a to exert the force on the yoke 30d needed to pull the slider arms 30b and 30c (FIG. 4) in the forward direction represented by arrow 25 (FIG. 4). In such cases, the pins 27 can be cut off and the delatching mechanism 30 removed and replaced with a delatching mechanism that is essentially identical to the delatching mechanism 30 except that the bail 30a is replaced with a pull tab. In contrast, the press-fit pins 7 of the known configuration shown in FIGS. 1-3 cannot be removed after they have been secured to the module housing 2 without damaging the module housing 2.

It should be noted that the optical transceiver module 20 can be used with or without the safety feature described above with reference to FIG. 7. The early-disengagement feature can be used beneficially without the safety feature 30a'. Likewise, the safety feature 30a' can be beneficially used on delatching mechanisms that do not have the early-disengagement feature described above with reference to FIGS. 3-6, such as with delatching mechanisms that are identical or similar to the known delatching mechanism 3 described above with reference to FIGS. 1-3, for example.

It should be noted that while the invention has been described with reference to an "optical transceiver module," the invention is not limited to use with optical communications modules that have both transmit and receive capability, but may also be used with optical receiver modules that have only receive capability and with optical transmitter modules that have only transmit capability. The term "optical transceiver module," as that term is used herein, describes any of the following: (1) a module that has both optical transmit and optical receive capability for transmitting and receiving optical signals over an optical waveguide; (2) a module that has optical transmit, but not optical receive, capability for transmitting optical signals over an optical waveguide; and (3) a module that has optical receive, but not optical transmit, capability for receiving optical signals over an optical waveguide.

It should be noted that the invention has been described with reference to a few illustrative embodiments for the purposes of demonstrating the principles and concepts of the invention. Many modifications may be made to the embodiments described herein without deviating from the scope of the invention. For example, while the delatching mechanism 30 is shown in the figures as having a particular configuration, it may have any one of a variety of configurations that allow the goals of the invention to be achieved. For example, some delatching mechanisms use a bail to operate a latch located on a lower surface of the module housing that engages a latch opening located on the lower surface of the cage. In such configurations, rotation of the bail from the latched position shown in FIG. 2 to the delatched position shown in FIG. 3 raises the latch of the module to disengage it from the latch opening of the cage. The early-disengage principles and concepts described herein can be applied to these and other delatching mechanisms that use a bail for this purpose. Persons skilled in the art will understand, in view of the description provided herein, the manner in which these and other modifications may be made and that all such modifications are within the scope of the invention.

What is claimed is:
1. An optical transceiver module comprising:
a module housing having at least a first receptacle formed in a front end thereof for receiving a first optical connector of a first optical fiber cable, the module housing having at least a top, a bottom, a first side and a second side; and
an early-disengage delatching mechanism secured to the module housing for delatching the module housing from a cage in which the module is stored in a latched state, the delatching mechanism comprising:
a bail having cams disposed on either end;
first and second slider arms extending along opposite sides of the module housing; and a yoke having cam followers disposed on either end, the yoke mechanically coupled to proximal ends of the first and second slider arms and to the bail, wherein rotation of the bail away from a latched position causes the cams of the bail to interact with the cam followers of the yoke at the end of a dwell stroke angle that is predetermined in a range between 0° and about 18°, the interaction causing the first and second slider arms to move in a forward direction during early-disengagement of the module housing from the cage.

2. The optical transceiver module of claim 1, wherein delatching of the module housing from the cage occurs at a predetermined delatching angle that is greater than the dwell stroke angle and less than or equal to about 80°.

3. The optical transceiver module of claim 1, wherein delatching of the module housing from the cage occurs at a predetermined delatching angle that is greater than the dwell stroke angle and less than or equal to about 50°.

4. The optical transceiver module of claim 3, wherein the predetermined delatching angle is about 46°.

5. The optical transceiver module of claim 1, wherein distal ends of the first and second slider arms have first and second hook features disposed thereon, respectively, that press outwardly on latches formed on opposite side walls of the cage as the slider arms move in the forward direction causing the latches to disengage respective latch stops disposed on the opposite sides of the module housing along which the first and second slider arms extend, wherein disengagement of the latches of the cage from the respective latch stops of the module housing delatches the module housing from the cage to allow the module to be extracted from the cage.

6. The optical transceiver module of claim 5, wherein the bail has a dwell stroke angle that is less than 12°, and wherein the first and second slider arms do not move in the forward direction during rotation of the bail from the latched position through the dwell stroke angle.

7. The optical transceiver module of claim 1, wherein the dwell stroke angle is greater than or equal to 5°.

8. The optical transceiver module of claim 1, wherein the dwell stroke angle is about 12°.

9. The optical transceiver module of claim 1, wherein the bail has an active stroke angular range that ranges from the dwell stroke angle to a predetermined delatching angle, and wherein the first and second slider arms move in the forward direction during rotation of the bail from the dwell stroke angle to the predetermined delatching angle such that the first and second hook features press outwardly on the latches of the cage as the bail is rotated from over the active stroke angular range until the latches of the cage are disengaged from the latch stops of the module housing.

10. The optical transceiver module of claim 1, further comprising a safety feature that prevents an optical connector from being mated with said at least one receptacle when the bail is not in the latched state.

11. The optical transceiver module of claim 10, wherein the safety feature is disposed on the bail.

12. The optical transceiver module of claim 11, wherein the safety feature is a widened portion of the bail that blocks an optical connector from being mated with said at least one receptacle when the bail is not in the latched position.

13. An optical transceiver module comprising:
a module housing having at least a first receptacle formed in a front end thereof for receiving a first optical connector of a first optical fiber cable, the module housing having at least a top, a bottom that is opposite the top, a first side and a second side that is opposite the first side;
a delatching mechanism secured to the module housing for delatching the module housing from a cage by rotating a bail of the delatching mechanism from a latched position to an active position through a dwell stroke angle, the active position characterized by the start of a forward movement of parts of the delatching mechanism associated with unlatching the module housing from the cage to allow the module to be extracted from the cage, wherein the parts of the delatching mechanism associated with unlatching the module housing from the cage include a yoke and first and second slider arms, the yoke being mechanically coupled to proximal ends of the first and second slider arms and to the bail, the slider arms extending along the first and second sides of the module housing, wherein rotation of the bail away from the latched position to the active position causes the yoke to move in a forward direction, wherein movement of the yoke in the forward direction causes the first and second slider arms to move in the forward direction along the first and second sides of the module housing, respectively, to delatch the module housing from the cage to allow the module to be extracted from the cage; and
a safety feature disposed on the delatching mechanism that prevents the first optical connector from being mated with the first receptacle when the bail is in a position that is rotated away from the latched position by an angle of about 90°.

14. The optical transceiver module of claim 13, wherein unlatching of the module housing from the cage occurs at a predetermined delatching angle that is greater than the dwell stroke angle and less than 90°.

15. The optical transceiver module of claim 14, wherein the predetermined delatching angle is greater than or equal to 30° and less than or equal to 80°.

16. The optical transceiver module of claim 15, wherein the predetermined delatching angle is greater than or equal to 40° and less than or equal to 50°.

17. The optical transceiver module of claim 16, wherein the predetermined delatching angle is about 46°.

18. The optical transceiver module of claim 13, wherein distal ends of the first and second slider arms have first and second hook features disposed thereon, respectively, that press outwardly on latches formed on opposite side walls of the cage as the slider arms move in the forward direction causing the latches to disengage respective latch stops disposed on the opposite sides of the module housing along which the first and second slider arms extend, wherein disengagement of the latches of the cage from the respective latch stops of the module housing delatches the module housing from the cage to allow the module to be extracted from the cage.

19. The optical transceiver module of claim 18, wherein the dwell stroke angle is greater than 0° from the latched position of the bail, and wherein the first and second slider arms do not move in the forward direction during rotation of the bail from the latched position of the bail through the dwell stroke angle.

20. The optical transceiver module of claim 19, wherein the dwell stroke angle is greater than or equal to 5° and less than or equal to 18°.

21. The optical transceiver module of claim 20, wherein the dwell stroke angle is about 12°.

22. The optical transceiver module of claim 19, wherein the bail has an active stroke angular range that ranges from the dwell stroke angle to a delatching angle, and wherein the first and second slider arms move in the forward direction during rotation of the bail from the passive stroke angle to the delatching angle such that the first and second hook features press outwardly on the latches of the cage as the bail is rotated from over the active stroke angular range until the latches of the cage are disengaged from the latch stops of the module housing.

23. The optical transceiver module of claim 13, wherein the bail and the yoke mechanically couple with one another via first and second cams of the bail and first and second cam followers, respectively, of the yoke, wherein rotation of the bail from the latched position toward the delatched position by a first predetermined angle brings the first and second cams into contact with the first and second cam followers, respectively, and wherein the first and second cams exert respective forces on the first and second cam followers during rotation of the bail from the first predetermined angle to the delatching angle to cause the yoke to move the first and second slider arms in a forward direction to delatch the module housing from the cage.

24. The optical transceiver module of claim 13, wherein the safety feature is a widened portion of the bail that blocks an optical connector from being mated with the first receptacle when the bail is in a position that is rotated away from the latched position by an angle of about 90°.

* * * * *